United States Patent [19]

Takeuchi

[11] 4,335,177
[45] Jun. 15, 1982

[54] GLASS FIBER-REINFORCED CEMENT PLATES

[75] Inventor: Shigeru Takeuchi, Osaka, Japan

[73] Assignee: Kurimoto Iron Works, Ltd., Osaka, Japan

[21] Appl. No.: 191,801

[22] Filed: Sep. 29, 1980

[30] Foreign Application Priority Data

Oct. 3, 1979 [JP] Japan .................. 54-129019
Jul. 18, 1980 [JP] Japan .................. 55-99041
Jul. 21, 1980 [JP] Japan .................. 55-99647

[51] Int. Cl.³ .................. B32B 5/12; B32B 5/14; B32B 5/28; B32B 13/14
[52] U.S. Cl. .................. 428/247; 428/251; 428/285; 428/289; 428/703
[58] Field of Search .................. 428/310, 703, 70, 218, 428/246, 247, 251, 284, 285, 289; 52/309.12, 309.17

[56] References Cited

U.S. PATENT DOCUMENTS

| | | | |
|---|---|---|---|
| 3,147,177 | 9/1964 | Owens et al. | 428/703 |
| 3,922,413 | 11/1975 | Reineman | 428/703 |
| 4,053,677 | 10/1977 | Corao | 52/309.12 |
| 4,195,110 | 3/1980 | Dierks et al. | 428/703 |

FOREIGN PATENT DOCUMENTS 1058396  2/1967  United Kingdom ............... 428/313

OTHER PUBLICATIONS

Kirk-Othmer, Encyclopedia of Chemical Technology, vol. 5, 3rd Edition, pp. 186-187.

Primary Examiner—William J. Van Balen
Attorney, Agent, or Firm—Blanchard, Flynn, Thiel, Boutell & Tanis

[57] ABSTRACT

This glass fiber-reinforced cement plate is comprised of both outside layers and an intermediate layer interposed therebetween, the former each comprising a glass fiber chopped strand-containing cement layer, the latter comprising a regulated set cement layer.

11 Claims, 16 Drawing Figures

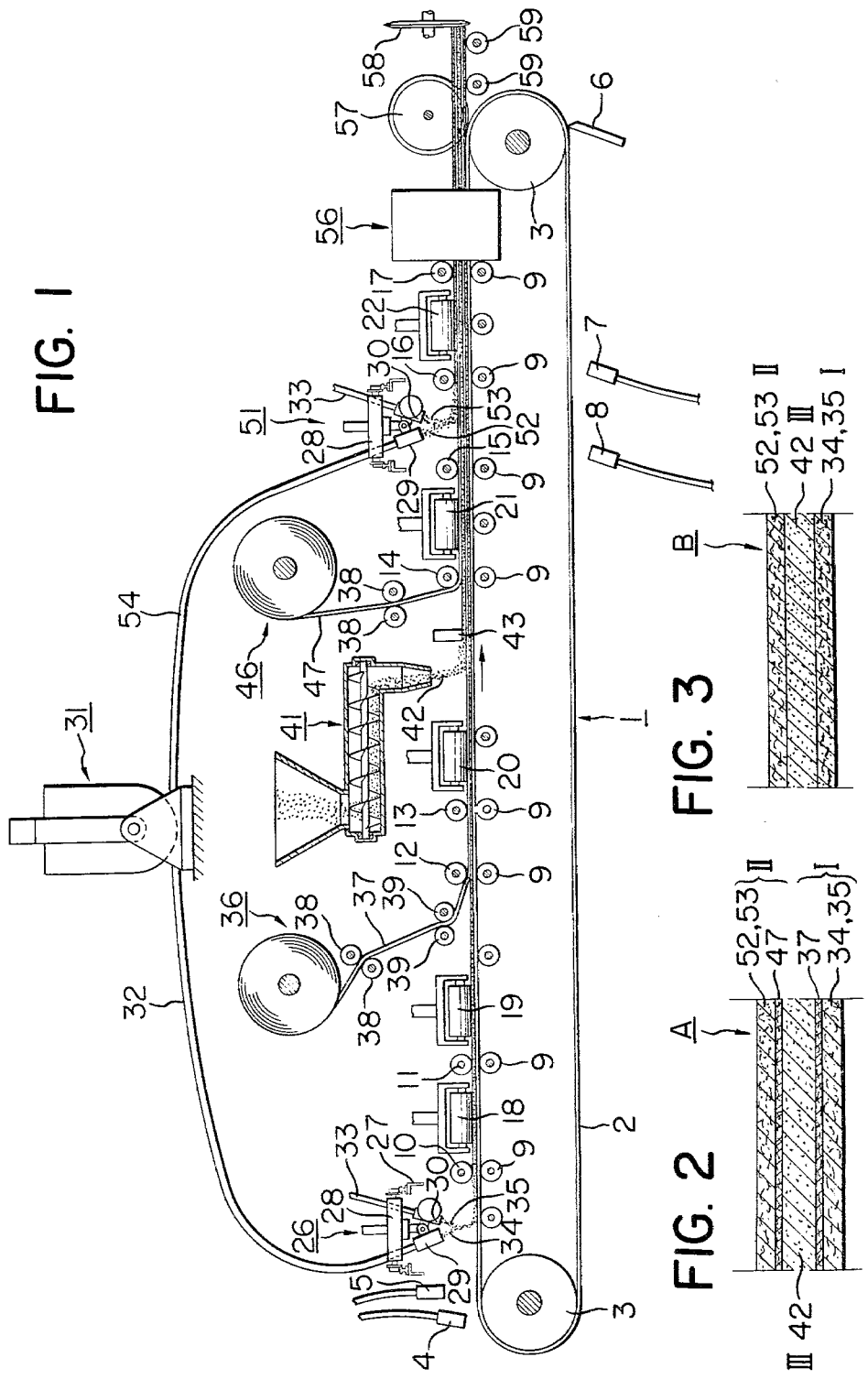

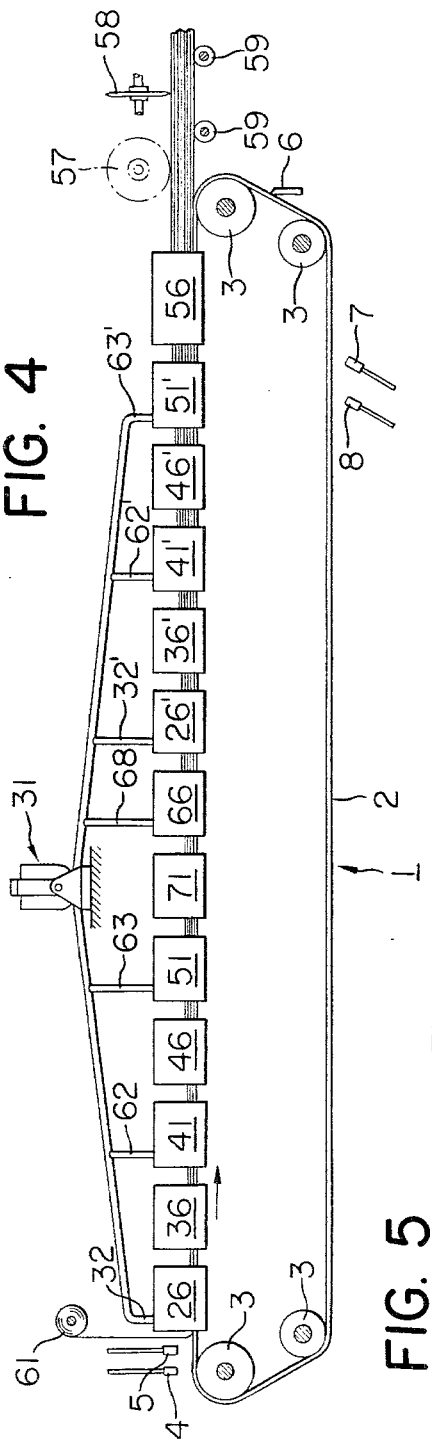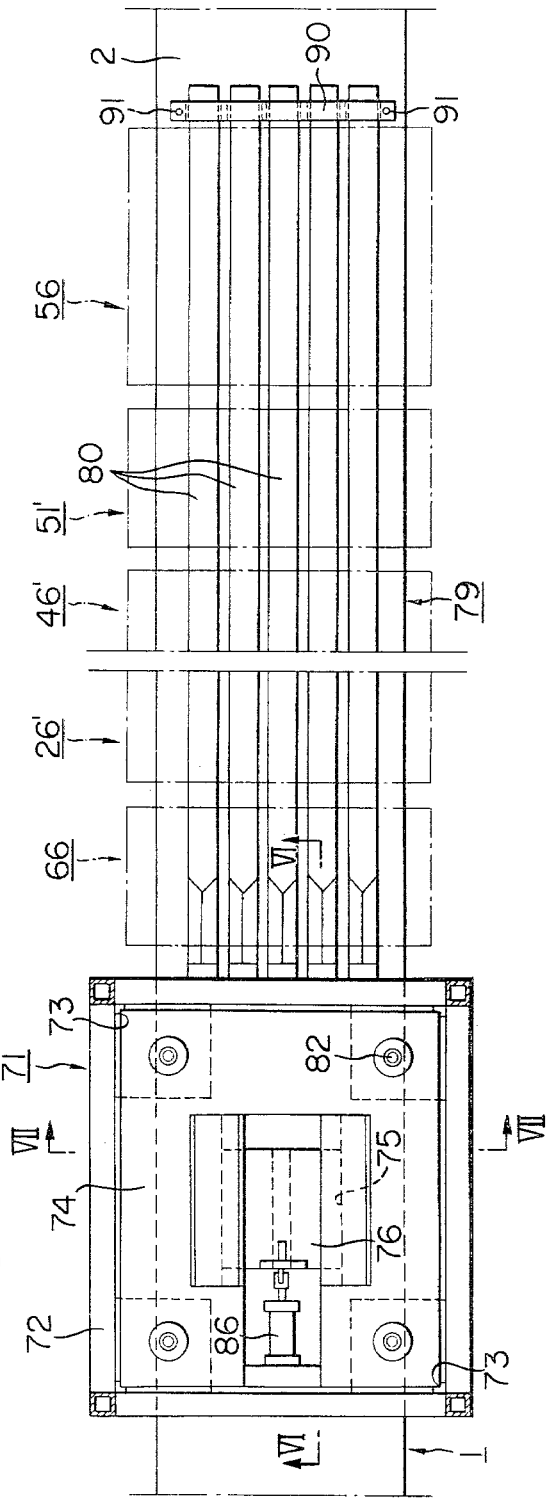

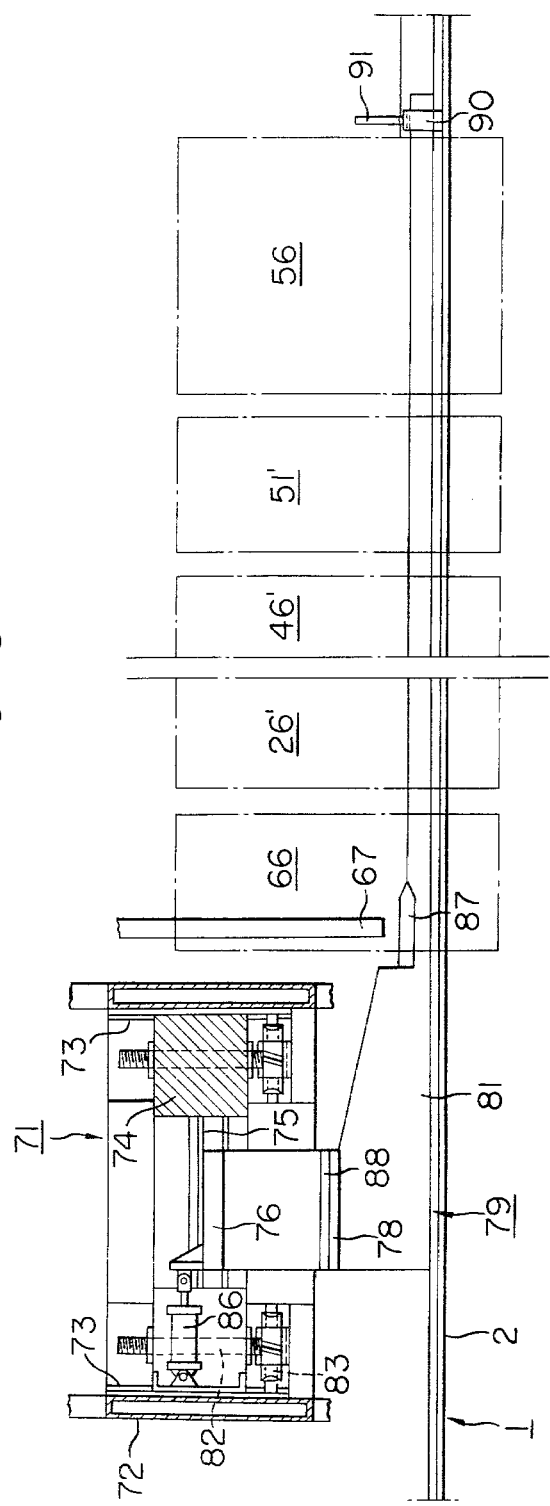

GLASS FIBER-REINFORCED CEMENT PLATES

BACKGROUND OF THE INVENTION

This invention relates to a continuous, automatic method of manufacturing, by a wet method, glass fiber-reinforced cement plates (which will be called GRC plates hereinafter) that are utilized as building materials like wall materials, fireproofing covering materials, sound insulating materials and so forth, and are advantageous because they are light weight and possess superior mechanical strength.

Conventional GRC plates have generally been manufactured by means of a spray up method comprising the steps of preparing a normal Portland cement mortar, cutting glass fiber by a cutter in suitable lengths so as to prepare chopped strand fibers, spraying said mortar and chopped strand fibers simultaneously in a flask so as to provide a suitable thickness, subjecting the same to one day's natural curing, and thereafter removing it from the flask.

This spray up method does not need special manufacturing techniques and equipment, but is defective in that the productivity of the spray up method, which is operated by the method, cannot be increased and consequently it involves unavoidable difficulties in providing cheap products.

Furthermore, conventional GRC plates have been manufactured in accordance with another method comprising the steps of spraying a cement-water type slurry together with chopped strands of glass fibers onto a conveyer to thereby form a layer of a mixture of both materials, and subjecting said layer to low pressure dehydration for hardening. This method is defective in that a water permeable mat and a dehydrating device are required in this case. Moreover, since it is difficult under existing circumstances to carry out the dehydration effectively, the products lack uniformity in quality. Moreover, since a long period of time is required for curing, the molding cycle is prolonged with reduced productivity, whereby it becomes extremely difficult, by this method, to provide cheap products.

SUMMARY OF THE INVENTION

It is an object of this invention to provide GRC plates which are capable of eliminating the aforesaid drawbacks inherent in conventional GRC plates and which can be manufactured in a short time and cheaply.

It is another object of this invention to provide GRC plates wherein the curing time can be shortened by constructing the plates such that both outside layers each comprise cement layer containing chopped strands of glass fibers and an intermediate layer, interposed between the outside layers and which comprises a regulated set cement.

It is a further object of this invention to provide GRC plates wherein the strength is further reinforced by the addition of continuous glass fibers to said both side layers.

It is still a further object of this invention to provide GRC plates wherein a plurality of parallel voids are formed penetrating the intermediate layer vertically to thereby impart characteristics such as light weight, heat insulating ability and sound insulating ability.

It is another important object of this invention to provide a method designed to manufacture GRC plates automatically and in a short time by laminating one outside layer comprising a normal Portland cement mortar and a glass fiber on a travelling belt conveyer, an intermediate layer comprising a regulated set cement mortar on said one outside layer, and the other outside layer comprising a normal Portland cement mortar and a glass fiber further thereon in order that the regulated set cement mortar of the intermediate layer permeates into the normal Portland cement mortar of each of the two outside layers, thereby permitting the GRC plate as a whole to harden in an extremely short time, and an apparatus therefor.

It is an additional object of this invention to provide a method capable of manufacturing light and highly insulating as well as sound insulating GRC plates which is so arranged that supply means for both of the side layer forming materials are disposed in before and behind positional relative above a travelling belt conveyer, a forming means for the intermediate layer having a plurality of vertically penetrated parallel voids interposed between the aforesaid supply means, said forming means including a molding flask having a multiplicity of long bar members spaced in parallel along the travelling direction of the conveyer belt and a supply means for regulated set cement mortar disposed above said molding flask, and predetermined materials are supplied to the respective means as aforesaid, and an apparatus therefor.

It is an even further object of this invention to provide a method capable of manufacturing GRC plates automatically and efficiently by supplying a glass fiber onto a travelling belt conveyer, further supplying a regulated set cement mortar thereon and still further supplying a glass fiber thereon so that an intermediate layer comprising a regulated set cement mortar may be interposed between both outside layers reinforced by the action of the regulated set cement mortar permeated into the glass fiber of each of the both outside layers therefrom, thereby further shortening the curing time, and an apparatus therefor.

it is the other object of this invention to provide a method capable of manufacturing GRC plates having necessary characteristics as occasion demands by disposing the respective supply means for glass fiber chopped strand, continuous glass fiber, normal Portland cement mortar, regulated set cement mortar, etc. in order above a travelling belt conveyer and along its travelling direction and changing the construction of the outside layer be selectively operating or not operating the respective supply means exclusive of the supply means for regulated set cement mortar, and an apparatus therefor.

BRIEF DESCRIPTION OF THE DRAWING

FIG. 1 is a schematic front view illustrating the partially cutaway inside of a first embodiment of the apparatus for manufacturing GRC plates according to this invention.

FIGS. 2 and 3 are sectional views partially illustrating different products manufactured in accordance with said first embodiment.

FIG. 4 is a schematic front view illustrating a second embodiment of the apparatus for manufacturing GRC plates according to this invention wherein the portions identical in construction with the first embodiment are depicted in block diagram.

FIG. 5 is an enlarged top plan view illustrating a connecting portion forming means of said second embodiment.

FIG. 6 is a sectional view taken on line VI—VI of FIG. 5.

DETAILED DESCRIPTION OF THE INVENTION

Figure 7:
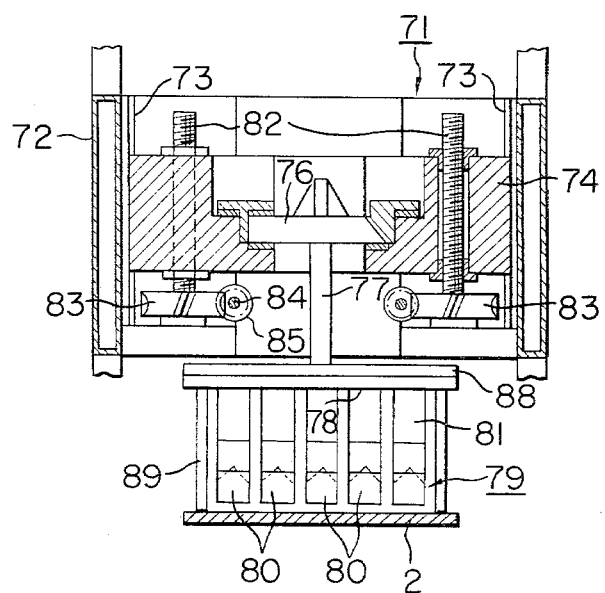
FIG. 7 is a sectional view taken on line VII—VII of FIG. 5.

FIG. 1 schematically illustrates a first embodiment of the method for manufacturing GRC plates according to this invention.

In FIG. 1, reference numeral 1 denotes a conveyer comprising an endless belt 2 made of a heat resisting material, such as steel, supported by a pair of fore and rear pulleys 3 and adapted to be moved at a fixed rate in the direction of the arrow by means of an appropriate driving means. Reference numeral 4 denotes an air blower disposed above the rear end of the conveyer 1 for cleaning the belt 2 by blowing air thereon, and reference numeral 5 denotes a means for spraying a parting material onto the belt 2. At the fore end there are provided a scraper 6 for removing adhering materials from the belt 2, a water injection nozzle 7 for injecting a washing water and an air blower 8 for blowing dry air. Reference numeral 9 denotes plural supporting rollers disposed under the belt 2, numerals 10 to 17 denote rollers disposed at desirable intervals above the belt 2 and rotating in the travelling direction of the belt, and numerals 18 to 22 denote rollers disposed on the belt 2 so as to make a reciprocating motion at a right angle to the travelling direction of the belt 2.

Reference numeral 26 denotes a supply means for normal Portland cement mortar and glass fiber chopped strand which comprises a spray nozzle 29 and a roving cutter 30 mounted in a vertically adjustable manner on a truck 29 reciprocates along rails 27 installed above and across the conveyer 1. Reference numeral 31 denotes a mixer connected to the nozzle 29 by means of a supply pipe 32, said mixer being utilized for making a normal Portland cement mortar by stirring a mixture of normal Portland cement, sand and water. Numeral 34 identifies the mortar sprayed through the nozzle 29. Reference numeral 33 denotes a glass fiber roving set in the cutter 30, wherein the cutter 30 cuts the fore end of the roving into chopped strands 35, the latter being sprayed in the mortar 34, and thereafter the roving is allowed to move forward within the cutter 30 as the cutting operation proceeds.

Reference numeral 36 denotes a supply means for continuous glass fiber, and 37 denotes a net material (with glass fiber roving) wound around a supporting shaft, said net material being constructed by weaving or knitting continuous glass fiber and designed to be pulled out upwardly of the belt 2 by means of plural sets of pull out rollers 38 and 39.

Reference numeral 41 denotes a supply means for regulated set cement mortar, said means being adapted for preparing a regulated set cement mortar 42 by mixing a composition of normal Portland cement and regulated set cement or a regulated set cement with sand and water and for stirring and supplying the thus obtained regulated set cement mortar onto the upper surface of the belt 2. A control means 43 for controlling the thickness of the layer is provided rearwardly of the supply means 41.

Reference numeral 46 denotes a supply means for continuous glass fiber having the exactly same structure as the means 36 and 51 denotes a supply means for normal Portland cement mortar and glass fiber chopped strand having the exactly same structure as the means 26. In this context, it is to be noted that the same numerals are attached to like parts.

Reference numeral 47 denotes a continuous glass fiber to be supplied by the supply means 46, numerals 52 and 53 denote normal Portland cement mortar and glass fiber chopped strands which are supplied by the supply means 51, and 54 denotes a supply pipe for a normal Portland cement mortar.

Reference numeral 56 denotes a curing room arranged to be heated to about 80° C., and a horizontally-orientated cutter 57 and a longitudinally-oriented cutter 58 are disposed rearwardly thereof, and 59 denotes a supporting roller for products.

As the regulated set cement used in this embodiment there can be enumerated one available under the trade name "Lion Shisui" from Osaka Cement K.K.

FIGS. 2 and 3 illustrate GRC plates A(FIG. 2) and B(FIG. 3) manufactured by means of the apparatus as aforesaid. First, reference will be made to the manner of preparing GRC plate A.

A mixture of normal Portland cement mortar 34 and glass fiber chopped strand 35, wherein the ratio of the former to the latter is in the range of from 1 to 5% by weight, is sprayed onto the belt 2 by means of the supply means 26 for cement mortar and glass fiber chopped strand. The mortar 34 and glass fiber chopped strand 35 are contacted by the rollers 10, 18, 11 and 19. The same is subjected to deairing, thereby obtaining a first stratum. Then, the net material 37 made of continuous glass fiber is superposed on the surface of said first stratum by means of the supply means 36, and is adhered to the mortar and fiber chopped strand 34 and 35 by means of rollers 12, 13 and 20, and is subjected to deairing, whereby there is formed an outside layer I.

Then, the regulated set cement mortar 42 is supplied in fixed quantities onto the surface of the thus travelling outside layer I by the supply means 41, the said surface is controlled by the control means 43 to thereby have a fixed thickness, and the same is subjected to adhering and deairing treatments by means of rollers 14, 21 and 15, whereby there is formed an intermediate layer III.

Onto the thus travelling intermediate layer III are successively supplied the continuous glass fiber 47 and then the mortar and fiber chopped strand 52 and 53 by means of the supply means 46 and 51 in the exactly same manner as employed in the case of the supply means 36 and 26. The thus treated surface is subjected to adhering and deairing treatments by means of rollers 14, 21, 15, 16, 22 and 17, whereby there is formed an outside layer II.

In the thus prepared plate, the regulated set cement permeates into the normal Portland cement mortar of the outside layers I and II adjacent thereto, and therefore when they are then passed through the curing room for curing purposes the hardening time can be shortened extremely, and the hardened plate can be cut into fixed widths by means of the cutter 57 and into fixed lengths by means of the cutter 58, whereby there can be obtained Product A.

In Product A which is constructed such that the outside layer I is comprised of the mixed layer 34, 35 of normal Portland cement and glass fiber chopped strand and the continuous glass fiber 37, the outside layer II is comprised of the mixed layer 52, 53 of normal Portland cement and glass fiber chopped strand and the continuous glass fiber layer 47 and the intermediate layer III comprises the regulated set cement layer 42, since this cement layer 42 permeates into the outside layers I and II through net voids of the continuous glass fiber layers 37 and 47 for connection, the bending strength of Product A can be enhanced greatly.

In the case of Product A, where the ratio of water to cement in the mortar has been set to be in the range of from 20 to 40% by weight, it was found that the time required from the beginning of molding to the removal of a product from the mold was about 20 to 40 minutes and that the bending strength of the product immediately after the removal was 20 to 30 $Kg/cm^2$, the bending strength after the lapse of one day from the completion of molding was 200 to 300 $Kg/cm^2$ and the bending strength after the lapse of three days was 250 to 350 $Kg/cm^2$.

In contrast, a GRC plate having the same thickness, but wherein the intermediate layer III is comprised of a normal Portland cement alone, was found to have a substantially equal bending strength but there is required an exceedingly long period of time, such as 8 to 8.5 hours, from the beginning of molding to the mold release.

In this connection, it is to be noted that in the case of this Product A the intermediate layer III may contain a glass fiber chopped strand.

Product B as illustrated in FIG. 3 can be obtained in accordance with the aforesaid embodiment with the exception that there was employed only the suitable supply means selected from among the above recited respective supply means. In other words, this Product B is prepared by mixing glass fiber chopped strand with the regulated set cement mortar 42 and supplying said mixture by the aid of the supply means 41 without using the supply means 36 and 46 utilized in the aforesaid embodiment. Accordingly, in the case of Product B the outside layers I and II are free of continuous glass fibers, while the intermediate layer III comprises the regulated set cement and glass fiber chopped strand. Therefore, it may be said that this product is suitable where a too large strength is not required but cheapness is called for.

In this connection, it is to be noted that in the case of this Product B the glass fiber chopped strand may be omitted from the intermediate layer III.

FIGS. 4 to 7 illustrate a second embodiment of the apparatus for manufacturing GRC plates according to this invention.

In this connection, it is to be noted that the same reference numerals as used in the first embodiment are applied to parts of the second embodiment corresponding to those of the first embodiment. Detailed explanation of these parts is omitted. Further explanation will be made mainly with reference to different portions.

Figure 8:
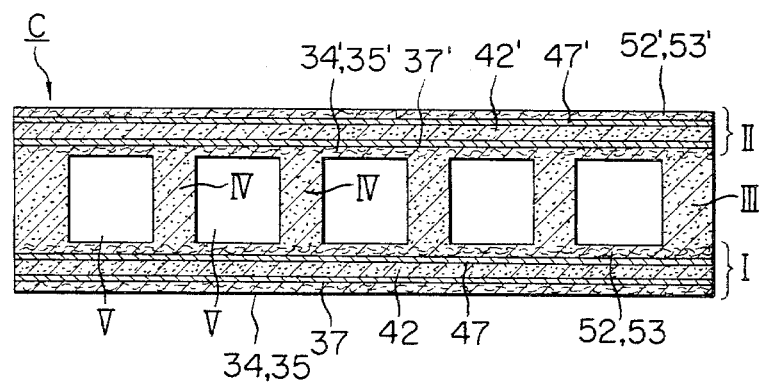
FIG. 8 is a sectional view of a product manufactured by said second embodiment.

This embodiment is utilized mainly for the purpose of manufacturing Product C as illustrated in FIG. 8. Said product is comprised of two outside layers I and II having the exactly same construction as Product A shown in FIG. 2 and an intermediate layer III, interposed therebetween, being connected by a plurality of parallel, spaced, regulated set cement mortar-made connecting walls IV and having openings V in the middle of said connecting walls IV.

In FIG. 4, reference numeral 61 denotes a parting sheet such as vinyl sheet, glass sheet, nylon sheet, paper or the like which is arranged to be overlapped the belt 2 and travel therewith.

And, this sheet may be used interchangeably with the spraying means for parting compound 5 depending on the molding conditions employed and so forth.

Reference numeral 71 denotes a means for forming the connecting wall IV, which particulars will be explained with reference to FIGS. 5 to 7.

This means 71 includes a lifting frame 74 which is designed to ascend and descend along vertical guide rails 73 disposed at the four corners of a frame 72 provided across the conveyer 1, a movable frame 76 reciprocating along guide rails 75 provided at both sides within this frame 74 along its travelling direction and a supporting frame 77 mounted detachably on the lower part of this movable frame 76. A molding flask 79 is fixed at its rear part to the lower part of this supporting frame 77. This molding flask 79 includes a multiplicity of long bar members 80 arranged in parallel at fixed intervals in the travelling direction of the belt 2. The rear part of this member 80 is formed into a fixing portion 81 extending upwards. The upper end of this fixing portion 81 is secured to the back of a horizontal plate 78. This plate 78 is fitted to a horizontal plate 88 provided at the lower end of the supporting frame 77. Side plates 89 are mounted on both back surfaces of the horizontal plate 78.

Further, vertical holes are perforated in the vicinity of the four corners of the lifting frame 74. The lower part of a screw bar 82 screwed into a screw tube fitted vertically in said hole is secured rotatably and non-liftably to the lower part of the frame 72, and a worm wheel 83 is secured to the lower end of each screw bar 82.

Reference numeral 84 denotes a pair of rotating shafts provided on both inner sides of the frame 72. The lifting frame 74 is designed to be raised and lowered in the manner of screw by engaging a worm 85, fixed to this shaft 84, with a worm wheel 83 and rotating these shafts 84 simultaneously by a suitable driving mechanism to thereby rotate each screw bar 82 by the aid of the worm 85 and worm wheel 83. In this connection, however, it is also possible to raise and lower the lifting frame 74 by using a means other than above illustrated means, for instance, such as a pressure oil cylinder or the like.

Reference numeral 86 denotes an air cylinder mounted on with the lifting frame 74. The piston rod of said cylinder is connected with the movable frame 76 for reciprocating the bar member 80, thereby finishing the inside of the mortar.

The bar member 80 in this embodiment is depicted to have a substantially square section and the upper side thereof in the vicinity of the rear end is formed into an angular portion 87. Apart from this, however, the section of this bar member 80 may take another optional shape, for instance, such as circular.

Reference numeral 66 denotes a supply means for regulated set cement mortar disposed at the rear of the forming means 71, said supply means being identical in structure with the supply means 41. The lower end opening of the mortar supply pipe 67 of this means 66, as shown in FIG. 6, is located above an angular portion 87 of each bar member 80.

In FIG. 4, reference numerals 26', 36', 41', 46' and 51' denote means which are identical in structure with the supply means for cement mortar and glass fiber chopped strand 26, supply means for continuous glass fiber 36, supply means for regulated set cement mortar 41, supply means for continuous glass fiber 46 and supply means for cement mortar and glass fiber chopped strand 51 respectively, and those means are disposed in turn in the rear of a supply means for regulated set cement mortar 66″.

Reference numeral 32′ denotes a pipe for supplying a normal Portland cement mortar from the mixer 31 to a supply means 26′, 62 and 62′ denotes pipes for supplying said normal Portland cement mortar from the mixer 31 to the supply means 41 and 41′, 63 and 63′ denote pipes for supplying the normal Portland cement mortar from the mixer 31 to the supply means 51 and 51′, and 68 denotes a pipe for supplying the normal Portland cement mortar from the mixer 31 to the supply means 66.

As is evident especially from FIGS. 5 and 6, the bar member 80 passes through each of these means and extends through a supporting member 90 to the outside of the curing room 56 to be supported thereby, said supporting member 90 being suspended by means of hanging members 91.

Reference will be made to the way of manufacturing the GRC plate illustrated in FIG. 8 by using the aforesaid apparatus hereinafter.

A plate body A (FIG. 2), being identical with that of the first embodiment, is formed on a parting sheet 61 by using the respective supply means 26, 36, 41, 46 and 51. This plate body A is allowed to pass below the forming means 71 and arrives at the supply means of for regulated set cement mortar, where the regulated set cement mortar is supplied from above onto the plate body through a supply pipe 67.

This mortar parts right and left at an angular portion 87 of each bar member 80 to fill the space between members 80, thereby forming a connecting wall IV, and simultaneously flows onto mortar layers 52 and 53 located on the upper part of the lower plate body A thereby to be in a body. At this time, the side plate 89 or another suitable side plate (not shown) acts to prevent the mortar from flowing down on both sides. Hereat, a thickness control means (not shown) levels the upper surface of the mortar filled within bar members 80 with the upper surface of a molding flask 79. During this time, the air cylinder 86 makes a reciprocating movement and the molding flask 79 also reciprocates in the travelling direction in concert therewith, whereby the inside surface of the wall of the opening V of the mold plate is finished. During this, the forming materials 34′, 35′, 37′, 42′, 47′, 52′ and 53′ are successively laminated by the action of supply means 26′, 36′, 41′, 46′ and 51′ in the exactly same manner as in the supply means 26, 36, 41, 46 and 51. Then, this mold plate arrives at a curing room 61 for curing purposes. When the cured plate reaches the supporting member 90, this supporting member 90 is taken away from the bar member 80, and the molding plate is cut by means of cutters 57 and 58 to obtain Product C.

Figure 9:
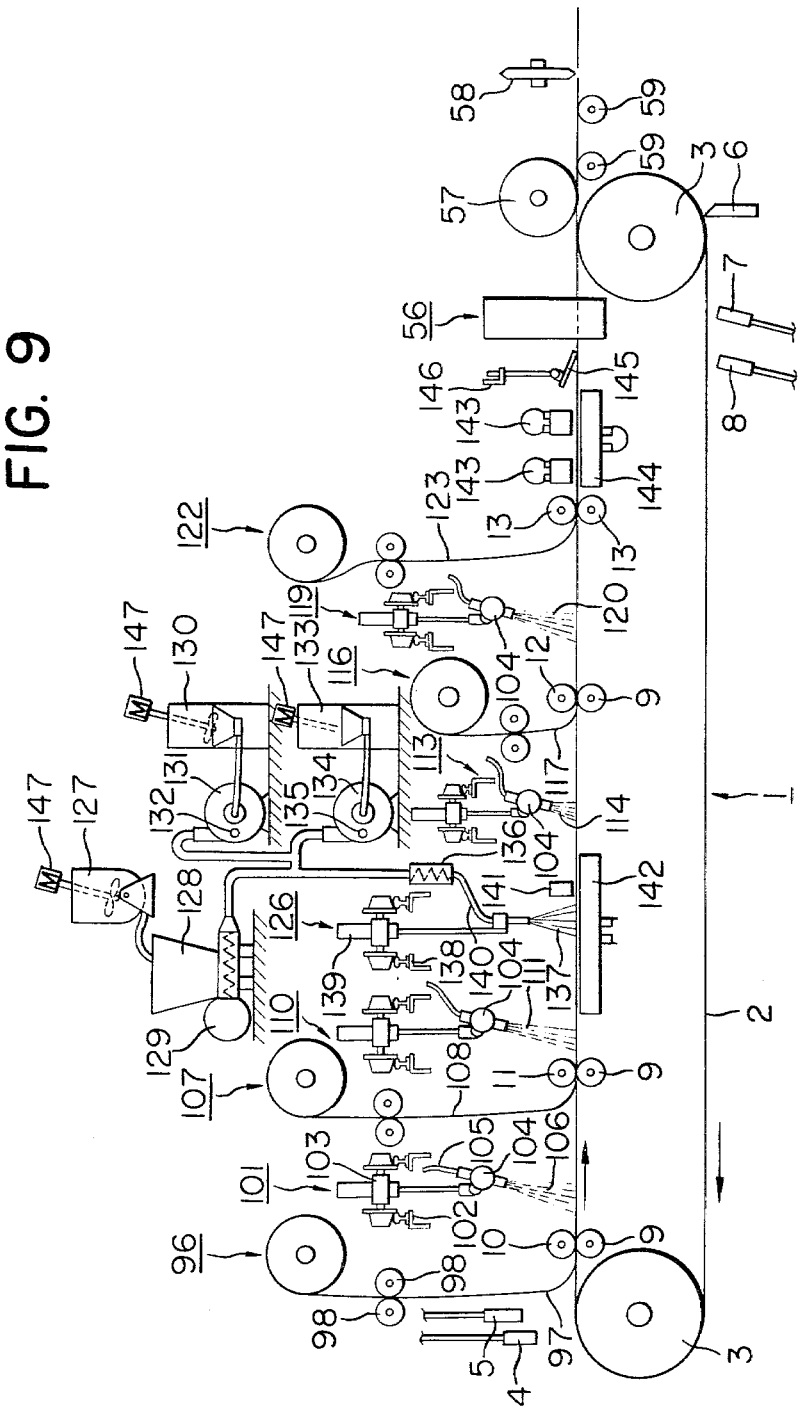
FIG. 9 is a schematic front view of a third embodiment of the apparatus for manufacturing GRC plates according to this invention.

FIG. 9 illustrates a third embodiment of the apparatus for manufacturing GRC plates according to this invention.

In this connection, it is to be noted that like the second embodiment, the same symbols will be applied to the means corresponding to those in the first embodiment for the purpose of simplifying the explanation.

In FIG. 9, reference numeral 96 denotes a supply means for continuous glass fiber equivalent to the supply means 36 in the first embodiment, wherein the continuous glass fiber 97 is arranged to be pulled out by a pull out roller 98.

Reference numeral 101 denotes a supply means for glass fiber chopped strand which, like the supply means 26 in the first embodiment, comprises mounting a roving cutter 104 in a vertically controllable manner on a truck 103 travelling on rails 102, 105 denotes a glass fiber roving and 106 denotes glass fibers chopped strand.

Reference numerals 107, 116 and 122 denote each a supply means for continuous glass fiber being exactly identical in structure with the supply means 96, and 110, 113 and 119 denotes each a supply means for glass fiber chopped strand being exactly identical in structure with the supply means 101.

Reference numeral 126 denotes a supply means for regulated set cement mortar disposed between the supply means 110 and 113. A normal Portland cement mortar prepared by means of a mixer 127 is fed into a pump 128 which is designed to be regulated by a variable speed motor 129 for discharging the mortar in optionally adjusted amounts. On the other hand, a mixture of regulated set cement and water is prepared in a tank 130 and then is fed into a pump 131 which functions to discharge the mixture in amounts adjusted optionally by an adjusting knob 132. A setter for adjusting the hardening time for the regulated set cement is mixed with the water in a tank 133, and the resulting mixture is fed into a pump 134 which is arranged to discharge the mixture in amounts adjusted optionally by an adjusting knob 135. The thus discharged normal Portland cement mortar, regulated set cement and setter are mixed and stirred by means of a mixer 136, thereby obtaining a regulated set cement mortar. This mortar 137 is supplied through a hose 140 mounted on a truck 139 which reciprocates in the horizontal direction of the conveyer 1 along rails 138 disposed above the conveyer 1. The hose 140 is mounted on the truck 139 in the vertically adjustable manner. A thickness control means 141 is disposed just behind the place at which the mortar is supplied, whereby the mortar 137 is allowed to form a deposit of a fixed thickness. A vibrator 142 is disposed on the back side of the belt 2 located under the means 126.

Reference numerals 143 and 144 denote vibrators disposed behind the means 122 and on both sides of the belt 2.

Reference numeral 145 denotes a doctor blade mounted vertically movably and rotatably on a fixed beam 146.

Reference numerals 147 denote motors for rotating the stirring blades equipped in the mixer 127 and tanks 130 and 133.

The mode of manufacturing GRC plates illustrated in FIG. 10 and following by means of the aforesaid apparatus will be explained hereinafter.

Figure 10:
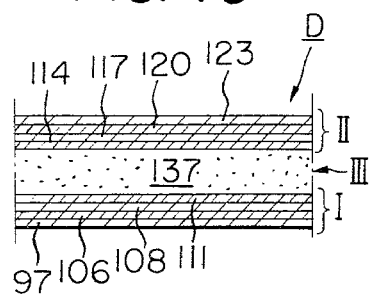
FIGS. 10 to 16 are sectional views partially illustrating different products manufactured in accordance with said third embodiment.

One outside layer 1 is formed by laminating the continuous glass fiber layer 97, glass fiber chopped strand layer 106, continuous fiber layer 108 and fiber chopped strand layer 111 in that order as illustrated in FIG. 10 by means of the respective supply means 96, 101, 107 and 110. Onto the upper surface of this layer I is supplied the cement mortar 137 through the hose 140 of the supply means for regulated set cement mortar 126. And, the vibrator 142 is actuated.

When this vibrator 142 is actuated, the mortar 137 permeates into the outside layer I, thereby forming thereon an intermediate layer III having a fixed thickness adjusted by the thickness control means 141.

In case where the hardening condition of the mortar supplied onto the conveyer 1 is bad or soft, the hardening condition may be improved by increasing the discharge amount of regulated set cement by operating the adjusting knob 132 of the pump 131. On the other hand, in case where the hardening time is too fast, it may be delayed by increasing the discharge amount of the setter by operating the adjusting knob 135 of the pump 134.

As is seen from the aforegoing, since the regulated set cement mortar is arranged to be prepared by mixing the separately prepared materials when actually used, it can dispense with the trouble of stocking excess regulated set cement mortar beforehand, and further since the aforesaid cement mortar is arranged to be supplied onto the belt along its horizontal direction, it can enhance the thickness controlling operation.

Then, onto the intermediate layer III is formed an upper side layer II which is prepared by laminating, reversing the aforesaid order, the fiber chopped strand layer 114, continuous fiber layer 117, fiber chopped strand layer 120 and continuous fiber layer 123 in order by means of the respective supply means 113, 116, 119 and 122. The same is vibrated by means of both the upper and lower vibrators 143 and 144, thereby permeating the mortar 137 of the intermediate layer III into the outside layer II, the thus treated surface is leveled by means of a doctor blade 145, and a good molding is thus obtained. This molding is then cured in the curing room 56, and is cut by means of cutters 57 and 58, thereby obtaining Product D.

Figure 11:
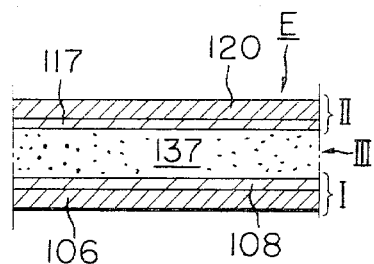

In this connection, it is to be noted that products other than Product D having the construction as shown in FIG. 10 can be obtained according to the aforesaid embodiment with the exception that only the suitable supply means selected from among those enumerated in the aforesaid embodiment are utilized, which will be referred to in FIG. 11 and following.

Product E illustrated in FIG. 11 is one obtained without using the supply means 96, 110, 113 and 122 of those included in the aforesaid embodiment, wherein the outside layer I comprises fibers 106 and 108 and the outside layer II comprises fibers 117 and 120. This product is superior in that both its surfaces possess good shock resistance.

Figure 12:
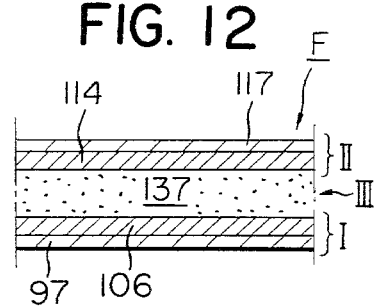

Product F illustrated in FIG. 12 is one obtained without using the supply means 107, 110, 119 and 122 of those included in the aforesaid embodiment, wherein the outside layer I comprises fibers 97 and 106 and the outside layer II comprises fibers 114 and 117. This product is of superior bending strength.

Figure 13:
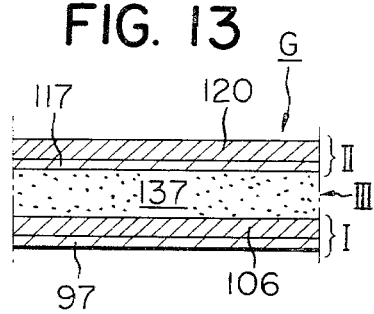

Product G illustrated in FIG. 13 is one obtained without using the supply means 107, 110, 113 and 122 of those included in the aforesaid embodiment. This product is different from Product F only in that the outside layer II comprises fibers 117 and 120 and can exhibit superior resistance against the shock and bending force exerted thereon from the upper direction in the drawing.

Figure 14:
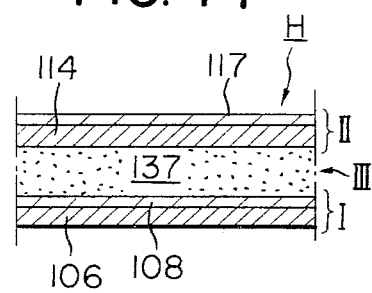

Product H illustrated in FIG. 14 is one obtained without using the supply means 96, 110, 119 and 122 of those included in the aforesaid embodiment. This product is different from Product E only in that the outside layer II comprises fibers 114 and 117 and can exhibit superior resistance against shock and bending force exerted thereon from the lower direction in the drawing.

Figure 15:
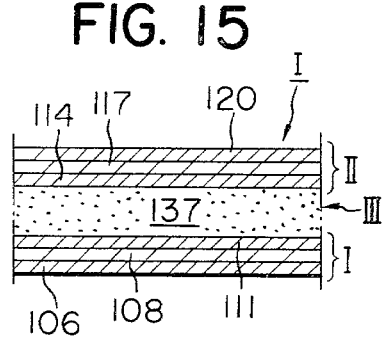

Product I illustrated in FIG. 15 is one obtained without using the supply means 96 and 122 of those included in the aforesaid embodiment. This product is different from Product D only in that both outside layers I and II comprise continuous fibers 97 and 123, wherein fibers chopped strand are arranged to prevent continuous fibers from gathering toward the center.

Figure 16:
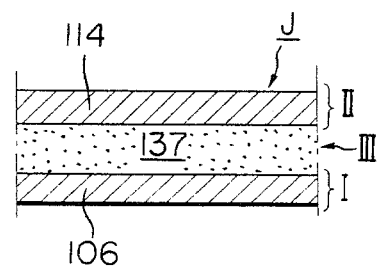

Product J illustrated in FIG. 16 is one obtained without using the supply means 96, 107, 110, 116, 119 and 122 of those included in the aforesaid embodiment, wherein both outside layers I and II comprise fibers chopped strand 106 and 114. This product is abundant in shock resistance.

In the aforesaid embodiment, the mortar 137 to be supplied through the supply means 126 and contain glass fibers chopped strand. Further, if the means 96 and 122 are arranged to supply various kinds of patterned films in lieu of continuous fibers as occasion demands, there may be obtained patterned GRC plates.

Still further, if a suitable amount of light insulating material such as Panlite, foamed glass or the like is compounded with the normal Portland cement in the mixer 127 there may be obtained a light insulating GRC plate which is abundant in strength.

Next, one instance of the composition of materials used in this embodiment will be shown as follows:

| Material | % by weight | |
|---|---|---|
| normal Portland cement | 100 | ⎫ |
| sand | 70–100 | ⎪ |
| water | 30–40 | ⎪ |
| dewatering agent | 1–3 | regulated set cement mortar |
| regulated set cement (Denka QT-2 produced by DENKI KAGAKU KOGYO) | 5–20 | ⎪ |
| setter (hardening time adjusting agent) | 0.2–1 | ⎭ |
| glass fiber chopped strand | 2–6 | |
| continuous glass fiber | 3–5 | |

EXAMPLE

A plate having a structure as illustrated in FIG. 11 and prepared by using the following materials was measured in respect of the bending strength. The measured results will be shown as one example hereinafter.

| (1) Material | Kg | |
|---|---|---|
| normal Portland cement | 100 | ⎫ |
| sand | 80 | ⎪ |
| water | 35 | regulated set cement mortar |
| dewatering agent | 2 | ⎪ |
| regulated set cement | 10 | ⎪ |
| setter | 0.3 | ⎭ |
| glass fiber chopped strand | 3 | |
| continuous glass fiber | 4 | |

(2) Bending strength

| Item | Age | | | | |
|---|---|---|---|---|---|
| | 1 day | 3 days | 7 days | 21 days | 28 days |
| Bending strength Kg/cm | 198.9 | 331.8 | 390.3 | 424.8 | 459.2 |

In this context, it is to be noted that the term "continuous glass fiber" used in the aforesaid respective embodiments implies a net material prepared by weaving or knitting the glass fiber and having a pitch of about 10 mm. And, it was found that when the thickness of the intermediate layer III was made about 40 to 80% of the total thickness there could be brought about preferable results in the points of molding time and curing time.

Although particular preferred embodiments of the invention have been disclosed hereinabove for purpose of illustration, it will be understood that variations or modifications thereof which lie within the scope of the invention as defined by the appended claims are fully contemplated.

What is claimed is:

1. A laminated, glass fiber-reinforced, hydraulic cement plate, comprising:
    a core of hydraulic cement mortar containing regulated set hydraulic cement, said core having two opposite faces; two laminated layer structures each bonded to a respectively opposite face of said core, each layer structure comprising a first layer of chopped glass fiber strands, said first layer having an inner surface and an outer surface, the inner surface of said first layer being disposed adjacent to the associated face of said core, a second layer of continuous glass fibers, said second layer having an inner surface and an outer surface, the inner surface of said second layer being disposed adjacent to the outer surface of said first layer and a third layer of chopped glass fiber strands, said third layer having an inner surface and an outer surface, the inner surface of said third layer being disposed adjacent to the outer surface of said second layer, said layer structures being impregnated with said mortar and being integral with said core.

2. A cement plate according to claim 1 wherein said core contains chopped glass fiber strands dispersed in said mortar.

3. A cement plate according to claim 1 or claim 2 wherein said layer structures each include a forth layer of continuous glass fibers, said fourth layer having an inner surface and an outer surface, the inner surface of said fourth layer being disposed adjacent to the outer surface of said third layer.

4. A cement plate according to claim 1 or claim 2 wherein said core contains a light insulating material in said mortar.

5. A cement plate according to claim 1 in which said mortar contains Portland cement and regulated set cement and the amount of said regulated set cement is from 5 to 20 parts by weight, per 100 parts by weight of said Portland cement.

6. A cement plate according to claim 5 wherein the weight of said chopped glass fiber strands is from 2 to 6 parts and the weight of said continuous glass fibers is from 3 to 5 parts, both per 100 parts by weight of said Portland cement.

7. A cement plate according to claim 1 wherein said continuous glass fiber layers are woven or knitted net materials having a pitch of about 10 mm.

8. A cement plate according to claim 3 wherein said continuous glass fiber layers are woven or knitted net materials having a pitch of about 10 mm.

9. A cement plate according to claim 1 wherein the thickness of said core is from 40 to 80% of the total thickness of said plate.

10. A cement plate according to claim 1 in which said third layers of said two layer structures are the exposed outermost layers of said cement plate.

11. A cement plate according to claim 3 in which said fourth layers of said two layer structures are the exposed outermost layers of said cement plate.

* * * * *